(12) United States Patent
Handa

(10) Patent No.: US 8,922,358 B2
(45) Date of Patent: Dec. 30, 2014

(54) DISPLAY APPARATUS

(75) Inventor: Kazunori Handa, Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 689 days.

(21) Appl. No.: 13/070,927

(22) Filed: Mar. 24, 2011

(65) Prior Publication Data

US 2011/0241859 A1  Oct. 6, 2011

(30) Foreign Application Priority Data

Apr. 5, 2010 (JP) ................................. 2010-087212

(51) Int. Cl.

| | | |
|---|---|---|
| *B60Q 1/00* | (2006.01) | |
| *B60L 11/18* | (2006.01) | |
| *B60K 6/448* | (2007.10) | |
| *B60K 6/52* | (2007.10) | |
| *B60L 11/12* | (2006.01) | |
| *B60W 50/14* | (2012.01) | |
| *B60K 35/00* | (2006.01) | |
| *B60L 11/14* | (2006.01) | |
| *B60W 20/00* | (2006.01) | |

(52) U.S. Cl.
CPC .............. *B60K 6/448* (2013.01); *B60L 2210/10* (2013.01); *B60L 11/1861* (2013.01); *B60L 2240/425* (2013.01); *B60L 2240/547* (2013.01);

(Continued)

(58) Field of Classification Search
CPC ........... B60K 6/448; B60K 2350/1076; B60K 2350/1092; B60K 2350/1096; B60L 11/1861; B60L 2260/52; B60L 2260/54; B60L 2250/16; B60W 50/14; B60W 20/00; B60W 2510/244

USPC .............. 340/425.5, 438, 439, 455, 459, 461, 340/988, 998; 701/22, 32.5, 123, 400, 408, 701/423; 903/903, 907, 908

See application file for complete search history.

(56) References Cited

U.S. PATENT DOCUMENTS

| | | | | |
|---|---|---|---|---|
| 8,234,028 B2 * | 7/2012 | Yamaguchi | ..................... | 701/22 |
| 8,521,408 B2 * | 8/2013 | Cho et al. | ...................... | 701/123 |

(Continued)

FOREIGN PATENT DOCUMENTS

| | | |
|---|---|---|
| JP | 4155321 B2 | 9/2008 |
| JP | 4251210 B2 | 4/2009 |

*Primary Examiner* — Brian Zimmerman
*Assistant Examiner* — An T Nguyen
(74) *Attorney, Agent, or Firm* — Birch, Stewart, Kolasch & Birch, LLP

(57) ABSTRACT

A display apparatus includes a display plane and a control unit. The display plane configured to display a first display portion that shows a locomotion region in the first locomotion mode in a display region based on the output request and a future locomotion distance of the vehicle and a second display portion that shows a locomotion region in the second locomotion mode next to the first display portion in the display region. The control unit configured to control an image displayed in the display plane. The control unit changes a border between the first display portion and the second display portion based on the future locomotion distance in accordance with an estimation result of displacement of a switching point between the first locomotion mode and the second locomotion mode.

8 Claims, 11 Drawing Sheets

(52) U.S. Cl.
CPC ........ *B60L 2240/549* (2013.01); *Y02T 10/7044* (2013.01); *B60L 2250/26* (2013.01); *B60L 2240/421* (2013.01); *B60L 2250/16* (2013.01); *Y02T 10/7241* (2013.01); *B60L 2260/28* (2013.01); *Y02T 10/6265* (2013.01); *Y02T 10/6243* (2013.01); *B60L 2240/80* (2013.01); *Y02T 10/7066* (2013.01); *B60L 2260/52* (2013.01); *B60W 2530/16* (2013.01); *B60W 2510/244* (2013.01); *Y02T 10/642* (2013.01); *B60L 2210/40* (2013.01); B60K 6/52 (2013.01); *B60K 2350/1092* (2013.01); B60L 11/123 (2013.01); *Y02T 10/7005* (2013.01); *B60L 2260/44* (2013.01); B60W 50/14 (2013.01); B60K 35/00 (2013.01); *B60W 2510/246* (2013.01); *Y02T 10/7216* (2013.01); *B60L 2240/545* (2013.01); *Y02T 10/6217* (2013.01); *B60W 20/00* (2013.01); *B60K 2350/1076* (2013.01); B60L 11/1868 (2013.01); *Y02T 10/84* (2013.01); *Y02T 10/7077* (2013.01); B60L 11/14 (2013.01); *B60L 2260/54* (2013.01); *Y10S 903/903* (2013.01); *Y10S 903/907* (2013.01); *Y10S 903/908* (2013.01)

USPC ........ 340/438; 340/425.5; 340/455; 340/461; 701/22; 701/123; 701/400; 903/903; 903/907; 903/908

(56) References Cited

U.S. PATENT DOCUMENTS

| 8,655,527 | B2* | 2/2014 | Harumoto et al. ............... 701/22 |
| 8,670,885 | B2* | 3/2014 | Gilman et al. .................. 701/22 |
| 2006/0181399 | A1* | 8/2006 | Sumiya ........................ 340/461 |
| 2009/0040033 | A1* | 2/2009 | Uchida ........................ 340/439 |
| 2009/0103278 | A1* | 4/2009 | Miyashita ...................... 362/29 |
| 2009/0125173 | A1* | 5/2009 | Komatsu et al. ................. 701/22 |
| 2009/0322503 | A1* | 12/2009 | Suzuki et al. .................. 340/438 |
| 2010/0010697 | A1* | 1/2010 | Soma et al. .................... 701/22 |
| 2010/0030413 | A1 | 2/2010 | Jinno |
| 2010/0222952 | A1* | 9/2010 | Yamaguchi ..................... 701/22 |
| 2011/0032110 | A1* | 2/2011 | Taguchi ...................... 340/636.1 |
| 2011/0241859 | A1* | 10/2011 | Handa ........................... 340/438 |
| 2012/0179420 | A1* | 7/2012 | Gilman et al. ................. 702/165 |
| 2014/0077941 | A1* | 3/2014 | Yamamura et al. ........... 340/438 |

* cited by examiner

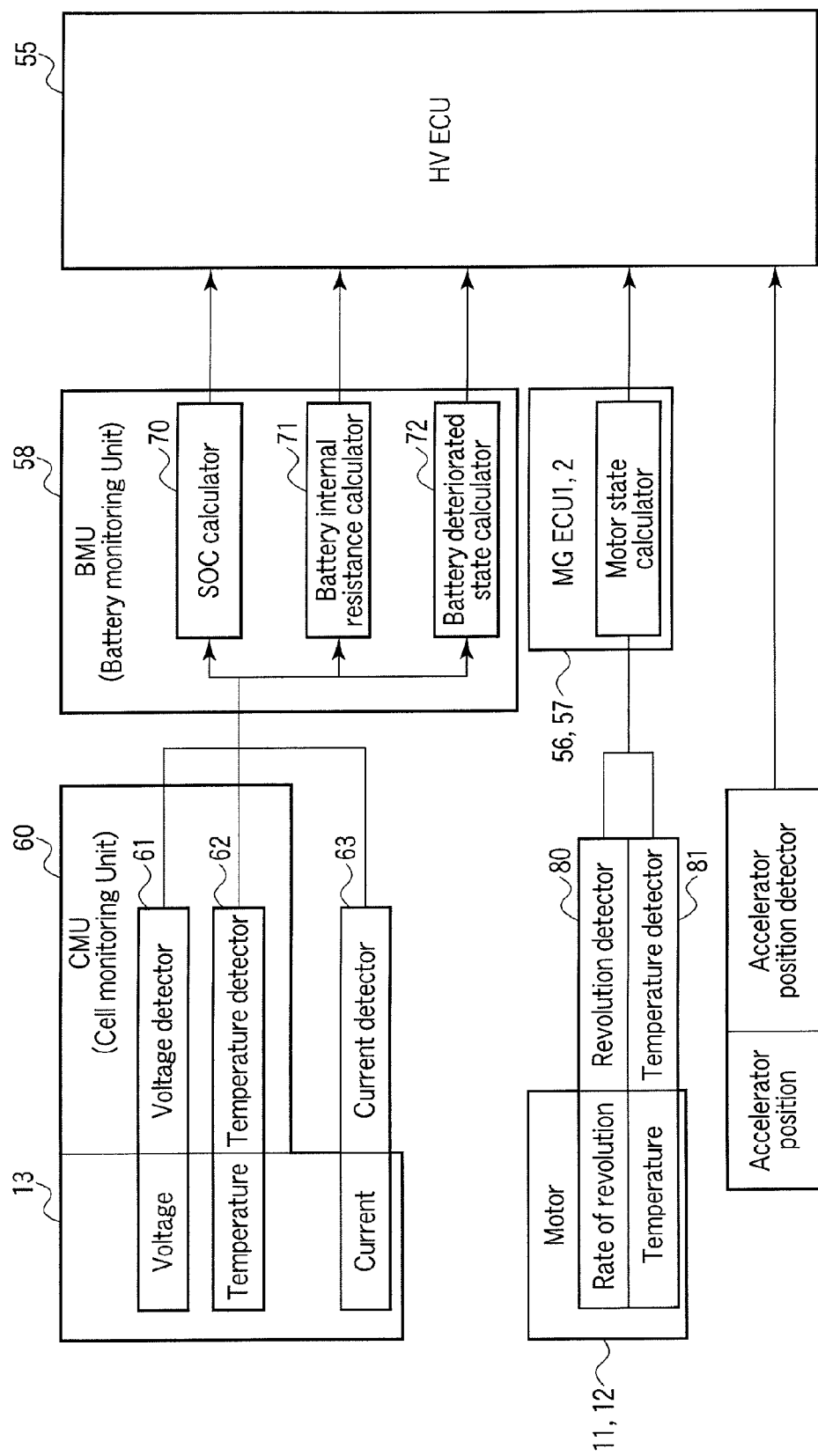
F I G. 2

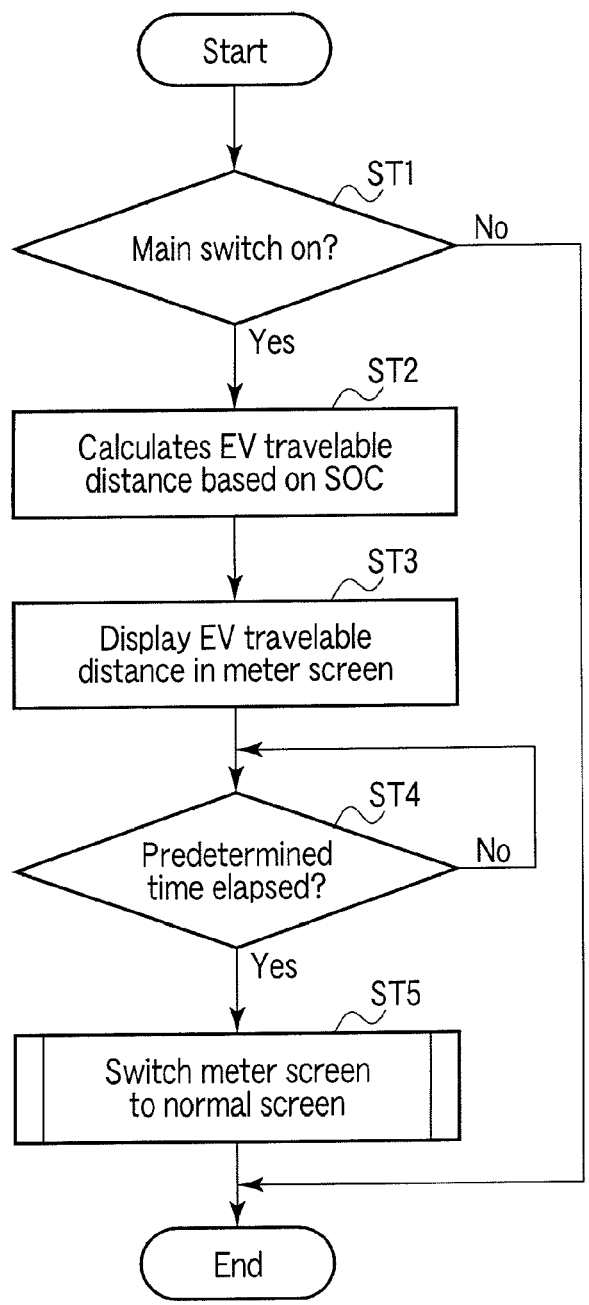
F I G. 9

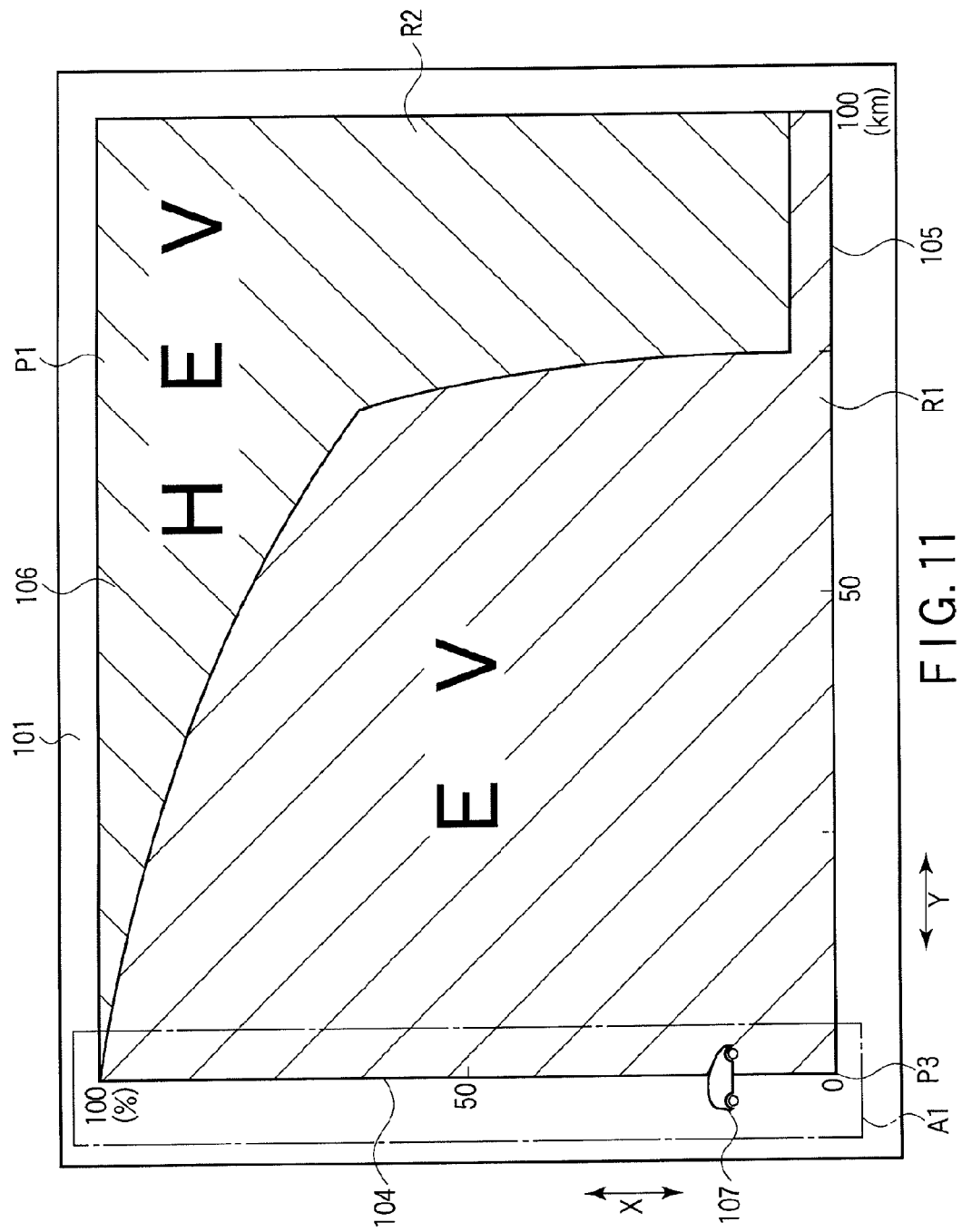

DISPLAY APPARATUS

CROSS-REFERENCE TO RELATED APPLICATIONS

This application is based upon and claims the benefit of priority from prior Japanese Patent Application No. 2010-087212, filed Apr. 5, 2010, the entire contents of which are incorporated herein by reference.

BACKGROUND OF THE INVENTION

1. Field of the Invention

The present invention relates to display apparatus for use in a hybrid vehicle comprising an electric motor for locomotion and an engine.

2. Description of the Related Art

A hybrid vehicle comprises an electric motor for locomotion and an engine. The hybrid vehicle is configured to switch between locomotion using the electric motor alone and hybrid locomotion using both the electric motor and the engine or locomotion using the engine alone in accordance with locomotion conditions and others.

As an example of the hybrid vehicle, the hybrid vehicle may carry out control of disabling the engine to effect locomotion using the electric motor alone when the extent of depressing an accelerator pedal is small or switching to hybrid locomotion when an accelerator operation amount has increased beyond a fixed level.

Further, a display apparatus is known. This display apparatus displays an electric motor locomotion zone and a hybrid locomotion zone in a background of a meter configured to indicate locomotion situations of a vehicle. Furthermore, an indicator moves between the electric motor locomotion zone and the hybrid locomotion zone in accordance with an accelerator operation amount. In this type of display apparatus, the indicator indicates the electric motor locomotion zone when the accelerator operation amount is small. Moreover, the indicator moves to the hybrid locomotion zone when the accelerator operation amount increases. This type of technology is disclosed in, e.g., Japanese Patent Publication No. 4155321 and Japanese Patent Publication No. 4251210.

Based on this technology, a driver can roughly recognize a distance for which the vehicle can travel by the electric motor locomotion alone based on a width of the electric motor locomotion zone.

On the other hand, the electric motor locomotion zone and the hybrid locomotion zone are displayed in the background of the meter configured to indicate a locomotion situation of the vehicle. A ratio of the electric motor locomotion zone and the hybrid motor locomotion zone is mainly determined based on a maximum output value that can be output from a battery.

Specifically, since the electric motor locomotion is possible even though the accelerator pedal is greatly depressed when the maximum output value from the battery is sufficiently high, the large width of the electric motor locomotion zone is set. Since the hybrid locomotion is carried out when the maximum output value from the battery is reduced, the width of the hybrid locomotion zone is enlarged. Therefore, the width of the electric motor locomotion zone is reduced.

However, as characteristics of the battery, the maximum output value of the battery is relatively hardly changed irrespective of the state of charge (SOC). Moreover, the maximum output value of the battery tends to be reduced as the SOC is extremely reduced. That is, when the SOC is extremely reduced, the electric motor locomotion zone is precipitously decreased. It is to be noted that, in other words, the SOC is a remaining battery capacity.

Therefore, it is difficult for the driver to appreciate a type of locomotion that will be effected by the electric motor alone. In other words, if locomotion will be continued, a relationship between a future locomotion distance and an accelerator operation amount required to continue the electric motor locomotion mode is hard to be appreciated.

SUMMARY OF THE INVENTION

According to an aspect of embodiments, a display apparatus provided in a vehicle in which one of a first locomotion mode that an engine is stopped to perform locomotion using an electric motor for locomotion and a second locomotion mode that the engine is driven to perform locomotion is selected in accordance with an output request.

The display apparatus includes a display plane and a control unit. The display plane configured to display a first display portion that shows a locomotion region in the first locomotion mode in a display region based on the output request and a future locomotion distance of the vehicle and a second display portion that shows a locomotion region in the second locomotion mode next to the first display portion in the display region. The control unit configured to control an image displayed in the display plane.

The control unit changes a border between the first display portion and the second display portion based on the future locomotion distance in accordance with an estimation result of displacement of a switching point between the first locomotion mode and the second locomotion mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing operations of an accelerator position detector, a hybrid ECU, an electric motor ECU, a battery ECU, and a battery detection unit and a relationship between these devices;

FIG. 9 is a flowchart showing an operation of a meter ECU depicted in FIG. 1;

FIG. 11 is a front view of a display unit showing a state that a display unit in a display apparatus according to a second embodiment of the present invention displays a locomotion mode display pattern.

DETAILED DESCRIPTION OF THE INVENTION

Figure 1:
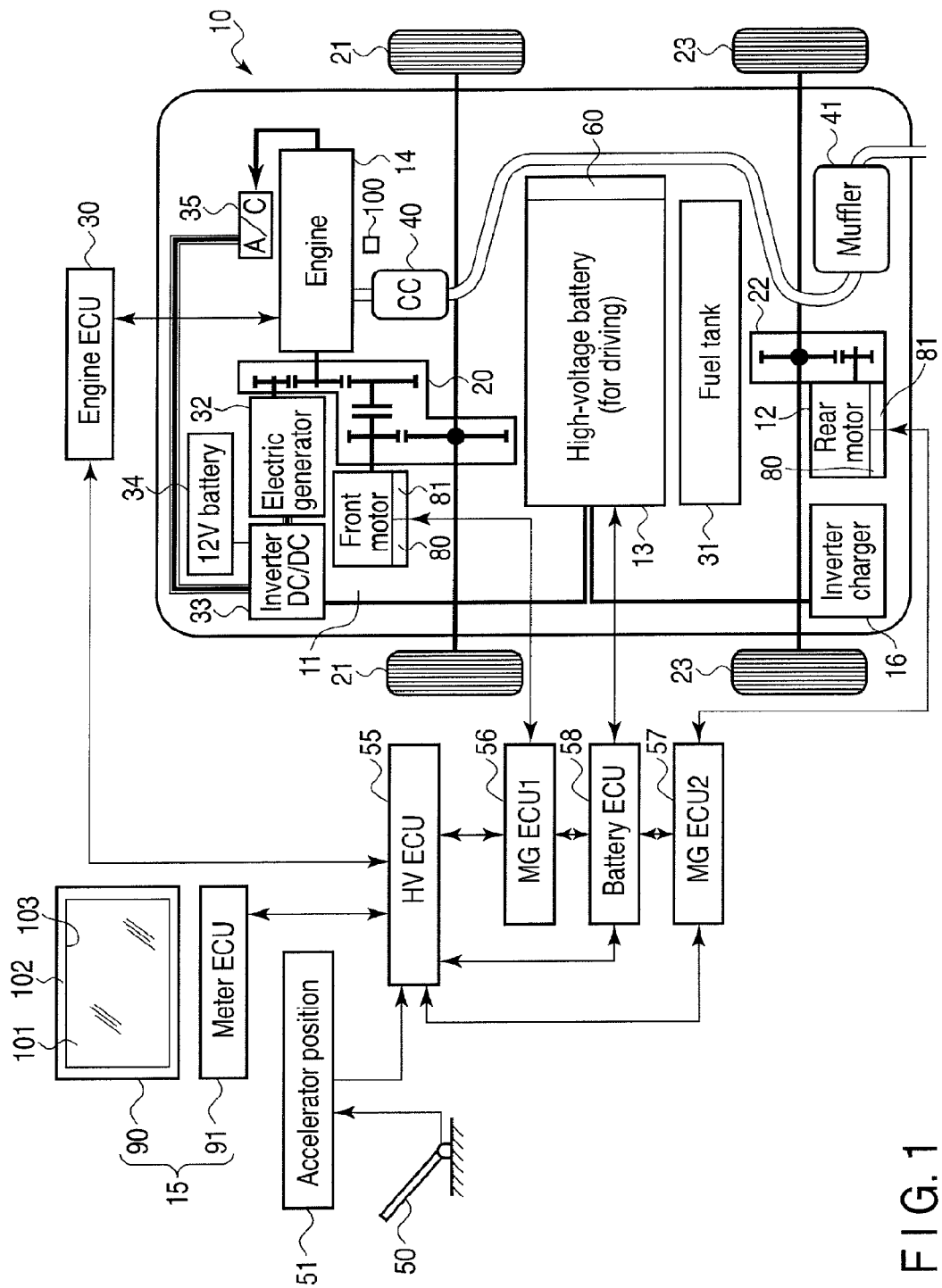
FIG. 1 is a schematic view showing an automobile including a display apparatus according to a first embodiment of the present invention.

A display apparatus according to a first embodiment of the present invention will now be described with reference to FIG. 1 to FIG. 10. A display apparatus 15 according to this embodiment is mounted in, e.g., an automobile 10. The automobile 10 is a hybrid car. FIG. 1 is a schematic view showing the automobile 10.

As shown in FIG. 1, the automobile 10 includes electric motors 11 and 12 for locomotion, a high-capacity driving battery 13 as a power supply for the electric motors 11 and 12, an engine 14 for locomotion, a display apparatus 15, and others. The battery 13 is configured by, e.g., connecting a plurality of cells in series to obtain a high voltage of 100 volts or above. The battery 13 can be charged with electric power supplied from, e.g., a commercial power supply through a non-illustrated charging cable and a charger 16.

The electric motor 11 on a front side rotates front wheels 21 through a power transmission mechanism 20. The electric motor 12 on a rear side rotates rear wheels 23 through a power transmission mechanism 22. The engine 14 is controlled by an engine electronic control unit (ECU) 30. The engine 14 is operated by a fuel supplied from a fuel tank 31. The engine 14 rotates the front wheels 21 through the power transmission mechanism 20. The engine 14 drives an electric generator 32. An output from the electric generator 32 is supplied to an in-vehicle battery 34 through an inverter 33. The inverter 33 is connected to an air-conditioning device 35. The inverter 33 is also utilized as a power supply for the air-conditioning device 35. Exhaust air from the engine 14 is discharged into air through an exhaust processing apparatus 40 and a muffler 41.

Moreover, the automobile 10 also includes an accelerator pedal 50 depressed by a driver when accelerating the automobile 10, an accelerator position detector 51 configured to detect an operation amount of the accelerator pedal 50, a hybrid ECU 55, electric motor ECUs 56 and 57, a battery ECU 58, a battery detection unit 60 configured to detect a state of the battery 13, a revolution detector 80, and a temperature detector 81.

FIG. 2 is a block diagram showing operations of the accelerator position detector 51, the hybrid ECU 55, the electric motors 56 and 57, the battery ECU 58, and the battery detection unit 60 configured to detect a state of the battery 13 and a relationship between these devices.

As shown in FIG. 2, the accelerator position detector 51 detects an operation amount of the accelerator pedal 50 operated by the driver. The accelerator position detector 51 outputs a detection result to the hybrid ECU 55.

The battery detection unit 60 is provided near the battery 13. The battery detection unit 60 includes a voltage detector 61, a temperature detector 62, and a current detector 63. The voltage detector 61 detects a voltage of the battery 13. The temperature detector 62 detects a temperature of the battery 13. The current detector 63 detects a current output from the battery 13. A detection value detected by the battery detection unit 60 is transmitted to the battery ECU 58.

The battery ECU 58 detects a state of the battery 13 based on a detection result obtained by the battery detection unit 60. Specifically, the battery ECU 58 includes an SOC calculator 70 configured to detect a state of charge in the battery 13 based on an output from the battery detection unit 60, a battery internal resistance calculator 71 configured to detect internal resistance of the battery 13, and a battery deteriorated state calculator 72 configured to detect a deteriorated state of the battery 13.

The revolution detector 80 and the temperature detector 81 are provided in each of the electric motors 11 and 12. The revolution detector 80 detects the rate of revolution of each of the electric motors 11 and 12. The temperature detector 81 detects a temperature of each of the electric motors 11 and 12. Detection values detected by the revolution detector 80 and the temperature detector 81 in the electric motor 12 are transmitted to the electric motor ECU 57. The electric motor ECU 57 monitors a state of the electric motor 12 based on the detection values obtained by the revolution detector 80 and the temperature detector 81. The detection values detected by the revolution detector 80 and the temperature detector 81 in the electric motor 11 are transmitted to the electric motor ECU 56. The electric motor ECU 56 monitors a state of the electric motor 11 based on the detection values obtained by the revolution detector 80 and the temperature detector 81.

The engine ECU 30, the accelerator position detector 51, the electric motor ECUs 56 and 57, and the battery ECU 58 are connected to the hybrid ECU 55. A detection value of the accelerator position detector 51, calculation results of the electric motor ECUs 56 and 57, and a calculation result of the battery ECU 58 are input to the hybrid ECU 55.

The hybrid ECU 55 has a function of controlling locomotion of the automobile 10. The automobile 10 has an EV locomotion mode that driving of the engine 14 is stopped to perform locomotion using the electric motors 11 and 12 alone and an HEV locomotion mode that the electric motors 11 and 12 and the engine 14 are driven to carry out locomotion. The EV locomotion mode is an example of a first locomotion mode in the present invention. The HEV locomotion mode is an example of a second locomotion mode in the present invention.

If the electric motors 11 and 12 alone can respond to an acceleration request from the driver, the hybrid ECU 55 selects the EV locomotion mode. If the electric motors 11 and 12 alone cannot respond to the acceleration request from the driver, the hybrid ECU 55 selects the HEV locomotion mode. Specifically, the hybrid ECU 5 switches the EV locomotion mode and the HEV locomotion mode to or from each other based on the state of charge (SOC) of the battery 13 and the extent of depression of the accelerator pedal 50 which is an acceleration request for the automobile 10. The SOC is, i.e., a remaining battery capacity.

When the EV locomotion mode is selected, the hybrid ECU 55 controls the engine ECU 30, the electric motor ECUs 56 and 57, and the battery ECU 58 to stop driving of the engine 14 and also drives the electric motors 11 and 12 in accordance with the extent of depression of the accelerator pedal 50. Based on this control and driving, the automobile 10 travels by the electric motors 11 and 12 alone in the EV locomotion mode. It is to be noted that the operation of depressing the accelerator pedal 50, i.e., a situation that the accelerator pedal is depressed is an example of an output request in the present invention. The output request is intensified as the extent of depressing the accelerator pedal 50 is increased.

When the hybrid locomotion mode is selected, the hybrid ECU 55 controls the engine ECU 30, the electric motors 56 and 57, and the battery ECU 58 to drive the engine 14 and the electric motors 11 and 12 in accordance with the extent of depressing the accelerator pedal 50. As a result, the automobile 10 travels by using the engine 14 and the electric motors 11 and 12 in the HEV locomotion mode.

As shown in FIG. 1, the display apparatus 15 includes a display apparatus main body 90 and a meter ECU 91. The display apparatus main body 90 is arranged at a position that can be visually confirmed by the driver, and it is provided on, e.g., an instrument panel of a driver's seat. It is preferable for the display apparatus main body 90 to be arranged at a position that can be visually confirmed by the driver. The display apparatus main body 90 has a function of displaying a driving situation of the automobile 10 to the driver and others.

The display apparatus main body 90 includes a display plane 101 on which video pictures are displayed and a frame portion 102 that supports the display plane 101, for example. The display plane 101 has, e.g., a rectangular shape. The frame portion 102 supports a peripheral edge portion of the display plane 101 so that the display plane 101 can be exposed to the outside. FIGS. 3 to 8 show the display plane 101 in an enlarged manner.

The display apparatus main body 90 can display a locomotion mode display pattern P1 and a distance display pattern P2. The locomotion mode display pattern P1 shows the locomotion mode of the automobile 10. FIGS. 4 to 8 show the locomotion mode display pattern P1. As shown in FIGS. 4 to 8, the locomotion mode display pattern P1 shows a relationship between the EV locomotion mode and the HEV locomotion mode with respect to the extent of depression of the accelerator pedal 50. The locomotion mode display pattern P1 includes a display region 106 defined by a first scale portion 104 and a second scale portion 105, an indicator 107, and a frame portion 108.

The first scale portion 104 and the second scale portion 105 are straight lines, and they are orthogonal to each other. The first scale portion 104 extends in parallel to a vertical direction in the drawing. The vertical direction X in the drawing is an example of a first direction in the present invention. The second scale portion 105 extends in parallel to a horizontal direction in the drawing. The horizontal direction Y in the drawing is an example of a second direction in the present invention. The first and second directions X and Y are orthogonal to each other.

Assuming that 100% means a state that the accelerator pedal 50 is fully depressed, the first scale portion 104 indicates a ratio that the accelerator pedal 50 is depressed. An upper end of the first scale portion 104 indicates 100% (a state that the accelerator pedal 50 is fully depressed) and a lower end of the same indicates 0% (a state that the accelerator pedal 50 is not depressed).

The indicator 107 can be displaced on the first scale portion 104, and it is arranged at a position corresponding to the detected extent of depression of the accelerator pedal 50. For example, if the extent of depression of the accelerator pedal 50 is 50%, the indicator 107 is arranged at a position of 50% on the first scale portion 104. The frame portion 108 surrounds the first scale portion 104.

The second scale portion 105 extends from a position of 0% of the first scale portion 104. The second scale portion 105 indicates the extent of depression of the accelerator pedal 50 shown on the first scale portion 104, i.e., a locomotion distance after detecting a position of the indicator 107. This means a future locomotion distance in the present invention. As advancing toward the right-hand side in the drawing, a future locomotion distance is indicated with a moment of the detection being determined as a reference. The unit of the second scale portion 105 is the kilometer (km). In regard to the second scale portion 105, the future locomotion distance increases as advancing toward the right-hand side in the drawing. A minimum value of the second scale portion 105 indicates a future locomotion distance 0 km, i.e., a moment of detecting an accelerator operation amount shown on the first scale portion 104.

For example, a position of 50 km on the second scale portion 105 indicates a situation that the automobile has further traveled 50 km after detection of the extent of depression of the accelerator pedal 50 indicated by the indicator 107 on the first scale portion 104. A right end of the second scale portion 105 indicates, e.g., 100 km in this embodiment.

As described above, the respective minimum values of the first and second scale portions 104 and 105 are provided at the same position P3 on the plane 101.

The display region 106 shows the EV locomotion region R1 and the HEV locomotion region R2 as required. The EV locomotion region R1 represents the first locomotion mode. Specifically, the EV locomotion region R1 represents the extent of depression of the accelerator pedal 50 that enables the automobile 10 to travel in the EV locomotion mode in a portion overlapping the first scale portion 104, i.e., the range of an operation amount. On the scale portion 105, the EV locomotion region R1 represents an estimated range of the extent of depression of the accelerator pedal 50 that enables locomotion in the EV locomotion mode when the automobile 10 further continues locomotion after detection of the extent of depression of the accelerator pedal 50.

More specifically, in the EV locomotion region R1, a portion on the first scale portion 104 indicates the extent of depression of the accelerator pedal 50 that enables the automobile 10 to travel in the EV locomotion mode, i.e., the range of an operation amount at the time of detecting the extent of depression of the accelerator pedal 50 shown on the first scale portion 104. In the EV locomotion range R1, a portion excluding 0 of the second scale portion 105 represents an estimated range of the extent of depression of the accelerator pedal 50 with which the feasibility of locomotion in the EV locomotion mode can be expected with a future locomotion distance indicated by the second scale portion 105. The EV locomotion region is an example of a first display portion in the present invention.

The HEV locomotion region R2 represents the second locomotion mode. Specifically, in a portion overlapping the first scale portion 104, the HEV locomotion region R2 indicates the extent of depression of the accelerator pedal 50 that enables the automobile 10 to travel in the HEV locomotion mode, i.e., the range of an operation amount. On the second scale portion 105, this region R2 indicates an expected range of the extent of depression of the accelerator pedal 50 that enables locomotion in the HEV locomotion mode when the automobile 10 further continues locomotion after detecting the extent of depression of the accelerator pedal 50.

More specifically, in the HEV locomotion region R2, a portion on the first scale portion 104 represents the extent of depression of the accelerator pedal 50 that enables the automobile 10 to travel in the HEV travel mode, i.e., the range of an operation amount at the time of detecting the extent of depression of the accelerator pedal 50 shown on the first scale portion 104. In the HEV locomotion region R2, a portion excluding 0 in the second scale portion 105 indicates an estimated range of the extent of depression of the accelerator pedal 50 that the feasibility of locomotion in the HEV locomotion mode can be estimated with an expected locomotion distance indicated by the second scale portion 105. The HEV locomotion region is an example of a second display portion in the present invention.

The EV locomotion region R1 and the HEV locomotion region R2 are shown in different colors. In the drawing, to represent a difference between the colors of the EV locomotion region R1 and the HEV locomotion region R2, the EV locomotion region R1 and the HEV locomotion region are shown with different types of hatching. For example, the EV locomotion region R1 is shown in blue, and the HEV locomotion region R2 is shown in red. The EV locomotion region R1 is an example of a first locomotion region in the present invention. The HEV locomotion region R2 is an example of a second locomotion region in the present invention.

As described above, the expected extent of depression of the accelerator pedal 50 for switching the EV locomotion mode and the HEV locomotion mode of the automobile 10 is calculated by a later-described meter ECU 91 based on an SOC of the battery 13. The expected extent of depression mentioned here is an example of a switching point in the present invention.

Figure 4:
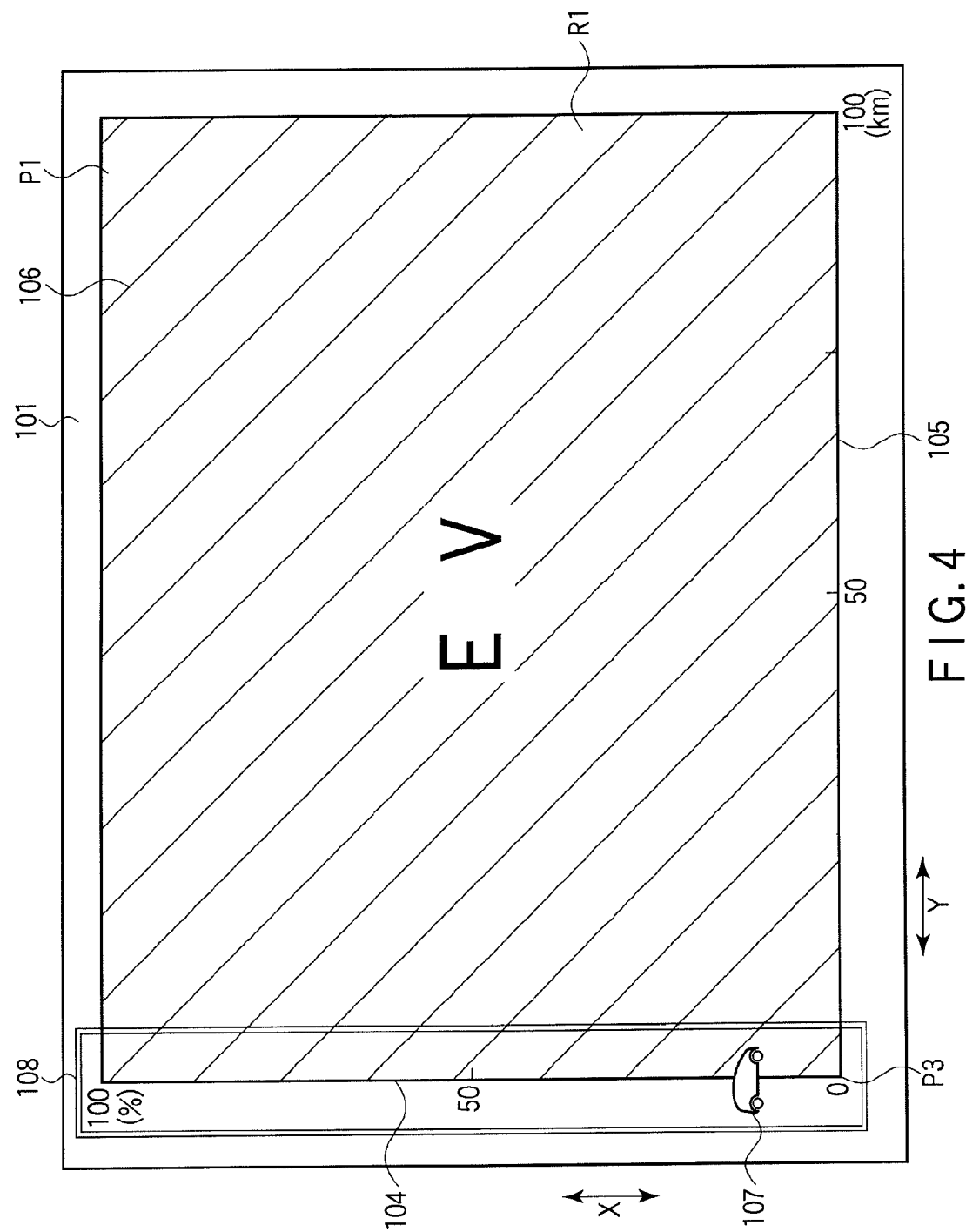
FIG. 4 is a front view of the display unit showing a state that the display plane depicted in FIG. 1 displays a locomotion mode display pattern.

FIG. 4 shows a state that the battery 13 is fully charged, and the entire display region 106 is occupied by the EV locomotion region R1. Therefore, this drawing shows that the automobile 10 travels in the EV locomotion mode even if the accelerator pedal 50 is fully depressed.

Figure 5:
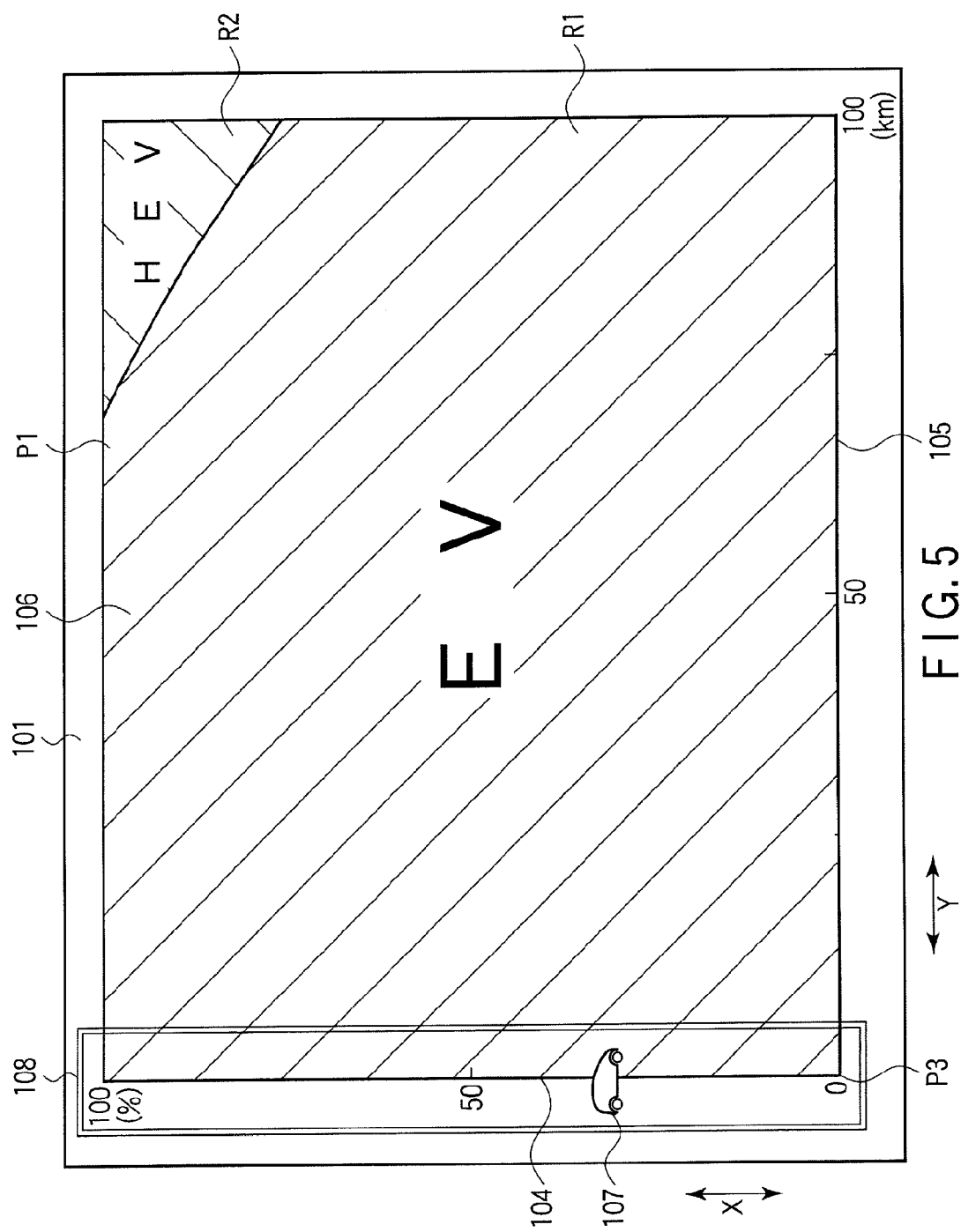
FIG. 5 is a front view of the display unit showing a state that the display plane depicted in FIG. 1 displays the locomotion mode display pattern.

FIG. 5 shows a state that the battery 13 is fully charged but the locomotion mode is changed to the HEV locomotion mode when locomotion continues for approximately 70 km or more and the accelerator pedal 50 is greatly depressed. The HEV locomotion region R2 is not shown in the display region 106 in the state of the battery 13 depicted in FIG. 4, and the HEV locomotion region R2 is shown in the display region 106 in the state of the battery 13 depicted in FIG. 5. This means that the second locomotion region in the present invention is displayed as required.

Figure 6:
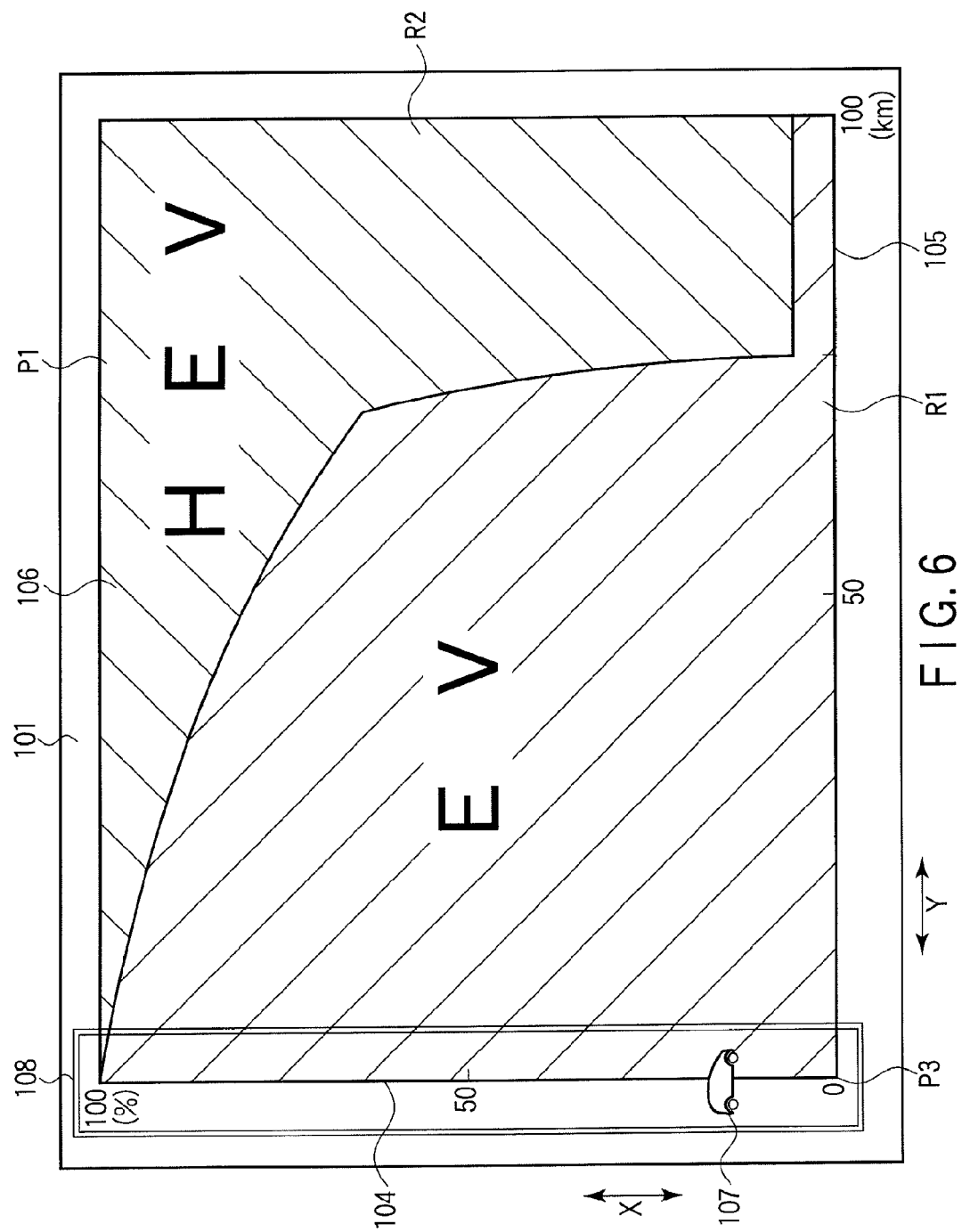
FIG. 6 is a front view of the display unit showing a state that the display plane depicted in FIG. 1 displays the locomotion mode display pattern.

FIG. 6 shows that the automobile 10 can travel in the EV locomotion mode even if the accelerator pedal 50 is fully depressed at the time of detecting the extent of depression of the accelerator pedal 50 indicated by the first scale portion 104, but the locomotion then changes to the HEV locomotion as a locomotion distance increases and the extent of depression of the accelerator pedal 50 is raised.

Furthermore, FIG. 6 also shows that the first locomotion region is precipitously reduced when the locomotion further continues for approximately 75 km. This means that a maximum output value of the battery 13 is substantially fixed without change until a remaining capacity of the battery 13 is reduced beyond a predetermined value, and that the maximum output value is precipitously decreased when the remaining capacity is reduced beyond the predetermined value.

Figure 7:
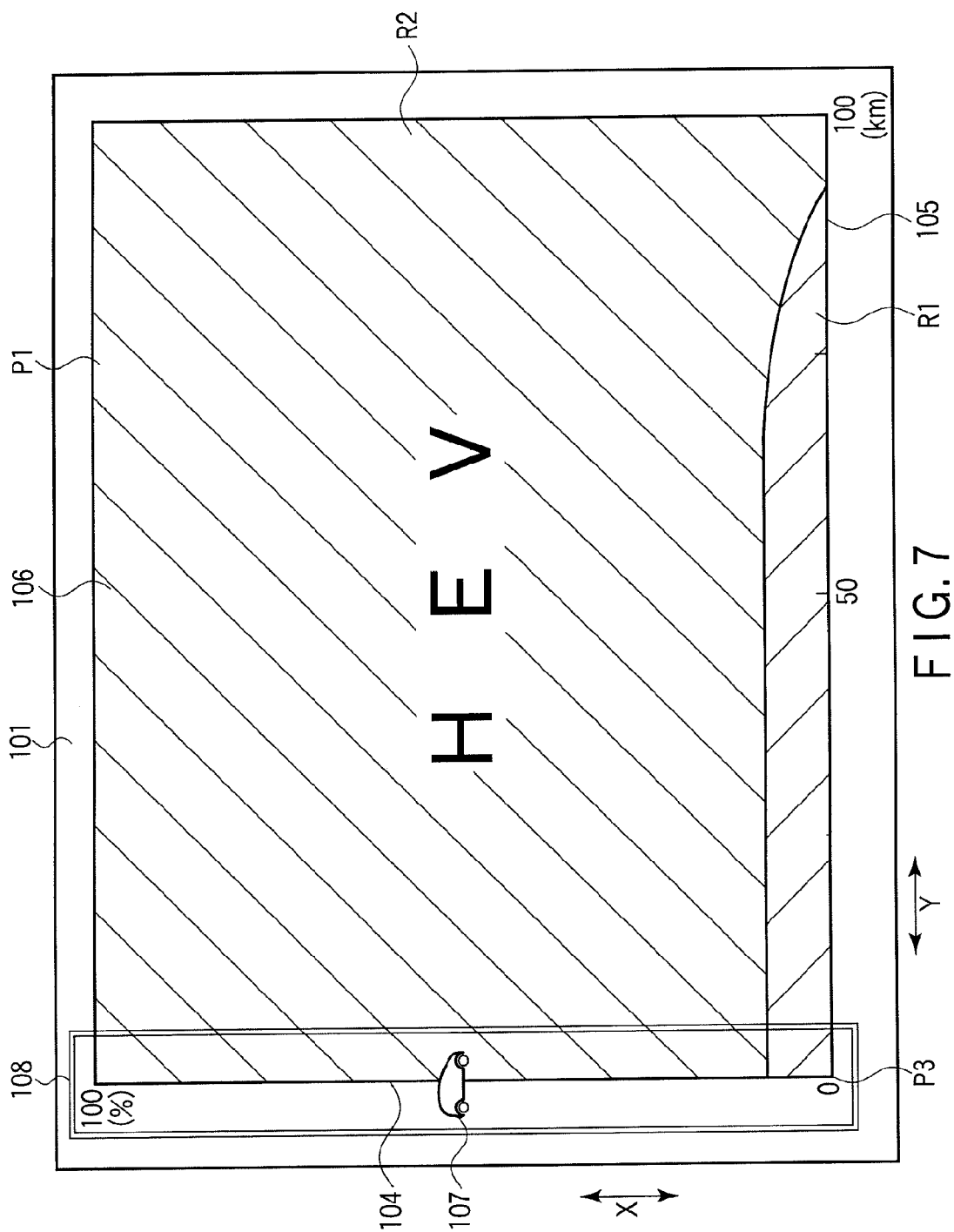
FIG. 7 is a front view of the display unit showing a state that the display plane depicted in FIG. 1 displays the locomotion mode display pattern.

FIG. 7 shows that the automobile 10 performs the HEV locomotion when the accelerator pedal 50 is depressed beyond approximately 20 percent at the time of detecting the extent of depression of the accelerator pedal 50 indicated by the first scale portion 104, and the HEV locomotion is performed after the locomotion continues for approximately 90 km.

Figure 8:
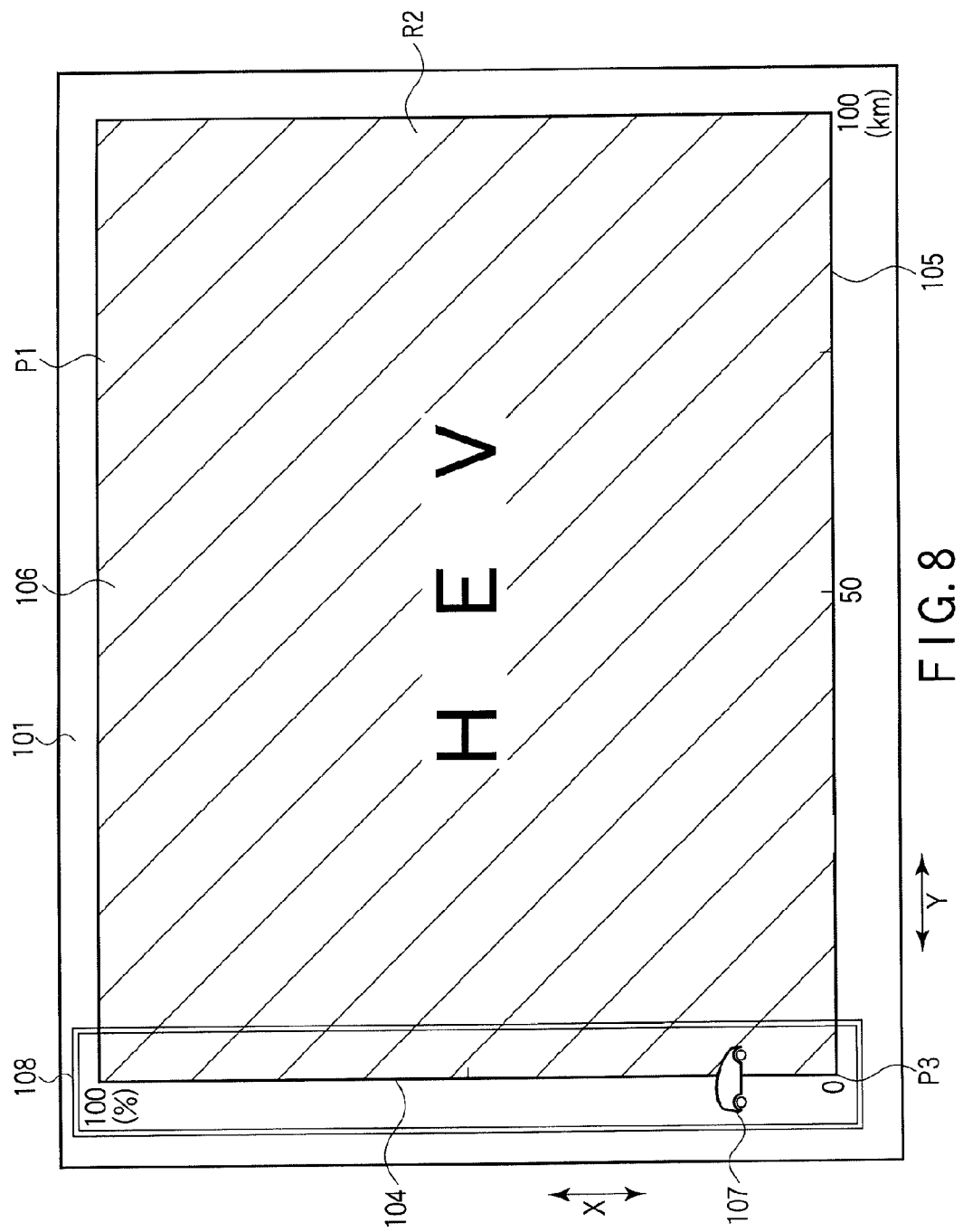
FIG. 8 is a front view of the display unit showing a state that the display plane depicted in FIG. 1 displays the locomotion mode display pattern.

FIG. 8 shows that an SOC of the battery 13 becomes, e.g., 0 and hence the automobile 10 can perform the HEV locomotion alone. In FIG. 8, the EV locomotion region R1 is not shown. This means that the EV locomotion region R1 in the present invention is displayed in the display region 106 as required.

When the driver adjusts an operation of the accelerator pedal 50 in such a manner that the extent of depression can fall within the range of the EV locomotion region R1 on the first scale portion 104, the automobile 10 can travel in the EV locomotion mode. Moreover, a distance that locomotion in the EV locomotion mode is possible from now can be confirmed.

Figure 3:
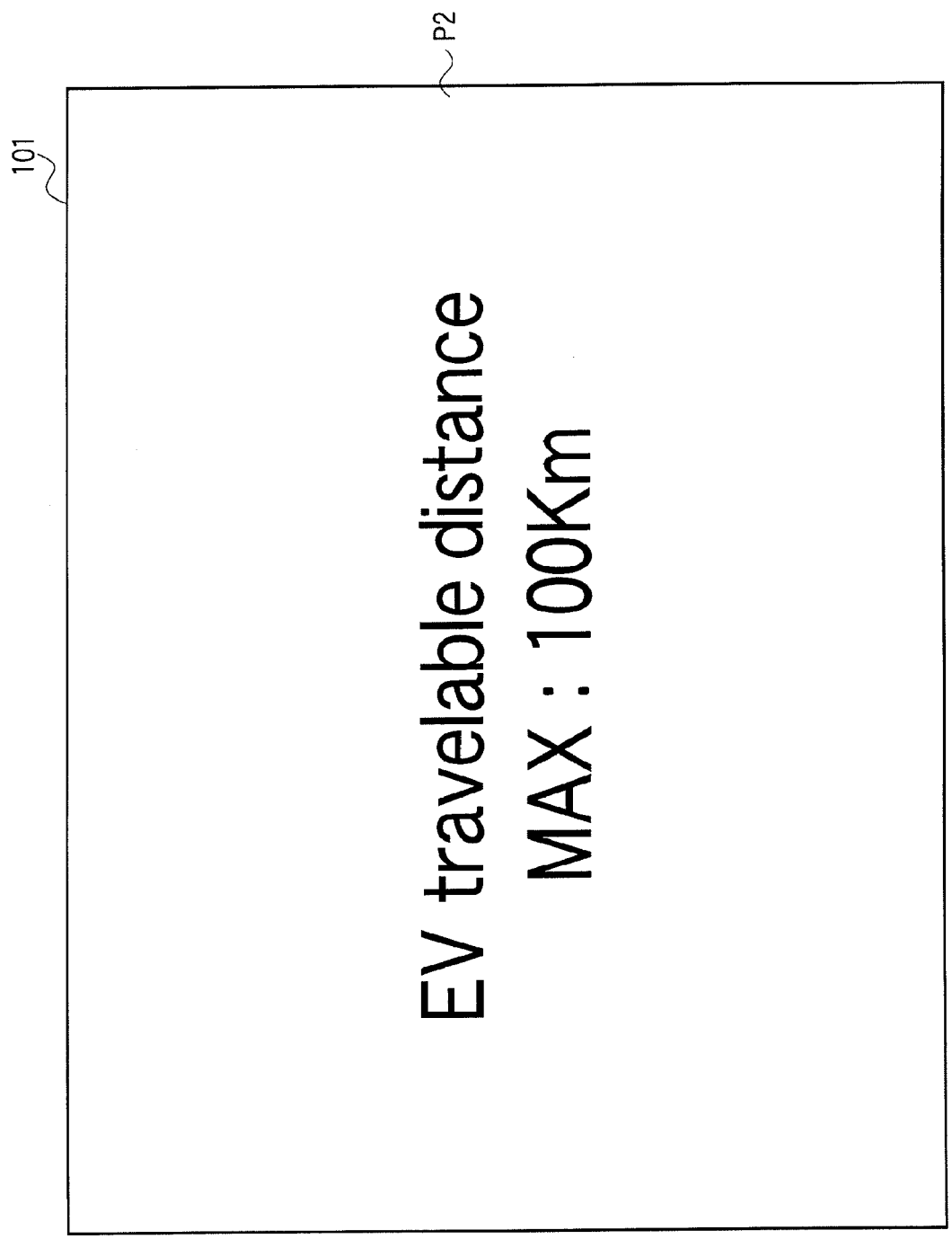
FIG. 3 is a front view of a display unit showing a state that a display plane depicted in FIG. 1 displays a distance display pattern.

The distance display pattern P2 will now be described. FIG. 3 shows the distance display pattern P2. The distance display pattern P2 shows an estimated travelable distance estimated to enable the EV locomotion at a time point that a main switch 100 of the automobile 10 is turned on. The main switch 100 being on as described herein means that the entire system of the automobile 10 is turned on and motion is possible when the driver depresses the accelerator pedal 50.

The meter ECU 91 performs a predetermined calculation based on information transmitted from the hybrid ECU 55 and controls operations of the display apparatus main body 90. The predetermined calculation will now be described in detail. The meter ECU 91 obtains information of the locomotion mode of the automobile 10, information of the extent of depression of the accelerator pedal 50, and SOC information of the battery 13 from the hybrid ECU 55. The meter ECU 91 calculates a distance that the automobile 10 can travel in the EV locomotion mode based on the SOC of the battery 13. Additionally, the meter ECU 91 calculates based on the SOC of the battery 13 the extent of depression of the accelerator pedal 50 required for switching between the EV locomotion mode and the HEV locomotion mode when the automobile 10 further continues the locomotion. The extent of depression of the accelerator pedal 50 required for switching between the EV locomotion mode and the HEV locomotion mode described herein is an example of a switching point in the present invention. Upon receiving the SOC information of the battery 13 from the hybrid ECU 55, the meter ECU 91 calculates a travelable distance for which the EV locomotion is possible to display the distance display pattern P2.

The meter ECU 91 displays the distance display pattern P2 in the display plane 101 for a predetermined time t when the main switch 100 is turned on, and it displays the locomotion mode display pattern P1 when the predetermined time t passes. This predetermined time t can be arbitrarily set in advance. The predetermined time t is, e.g., 30 seconds or 1 minute, and it may be an average time of a time taken until the driver depresses the accelerator pedal 50 after the main switch 100 is turned on. This average time can be obtained by an experiment and the like in advance.

A state that the main switch 100 of the automobile 10 is turned on will now be described. In this embodiment, for example, when the driver inserts an ignition key into a key cylinder and turns the ignition key to on the on position, the main switch 100 is turned on. That is, the automobile 10 can enter a locomotion enabled state. Further, when the driver turns the ignition key to the off position, the main switch 100 is turned off.

It is to be noted that an operation of turning on the main switch 100 is not restricted to that described above. For example, if the automobile 10 has a configuration that the main switch 100 is turned on by pushing a switch, the main switch 100 is turned on when the switch is pushed. When the switch is again pushed, the main switch 100 is turned off. As described above, the state that the main switch 100 is turned on is arbitrarily set based on a configuration of the automobile.

An operation of the display apparatus 15 will now be descried while taking an example that the automobile 10 travels with the fully charged battery 13. FIG. 9 is a flowchart showing an operation of the meter ECU 91 of the display apparatus 15. As shown in FIG. 9, the meter ECU 91 determines whether the main switch 100 has been turned on. Information indicative of whether the main switch 100 is on is transmitted from the hybrid ECU 55. When the main switch 100 is on, the processing advances to step ST2.

In step ST2, the meter ECU 91 calculates an estimated travelable distance for which the automobile 10 can travel in the EV locomotion mode based on SOC information of the battery 13 transmitted from the hybrid ECU 55. When the travelable distance is calculated, the processing advances to step ST3.

In step ST3, the meter ECU 91 displays the distance display pattern 22 in the display plane 101 as shown in FIG. 3. In this embodiment, the locomotion 100 km in the EV locomotion mode is possible with a fully charged battery 13. The meter ECU 91 calculates 100 km as an EV travelable distance and displays "100 km". When the distance display pattern P2 is displayed on the display plane 101, the processing advances to step ST4.

In step ST4, the meter ECU 91 detects an elapsed time after display of the distance display pattern P2. When a display time passes a previously set predetermined time t, the processing advances to step ST5. In step ST5, the meter ECU 91 switches display from the distance display pattern P2 to the locomotion mode display pattern P1.

Figure 10:
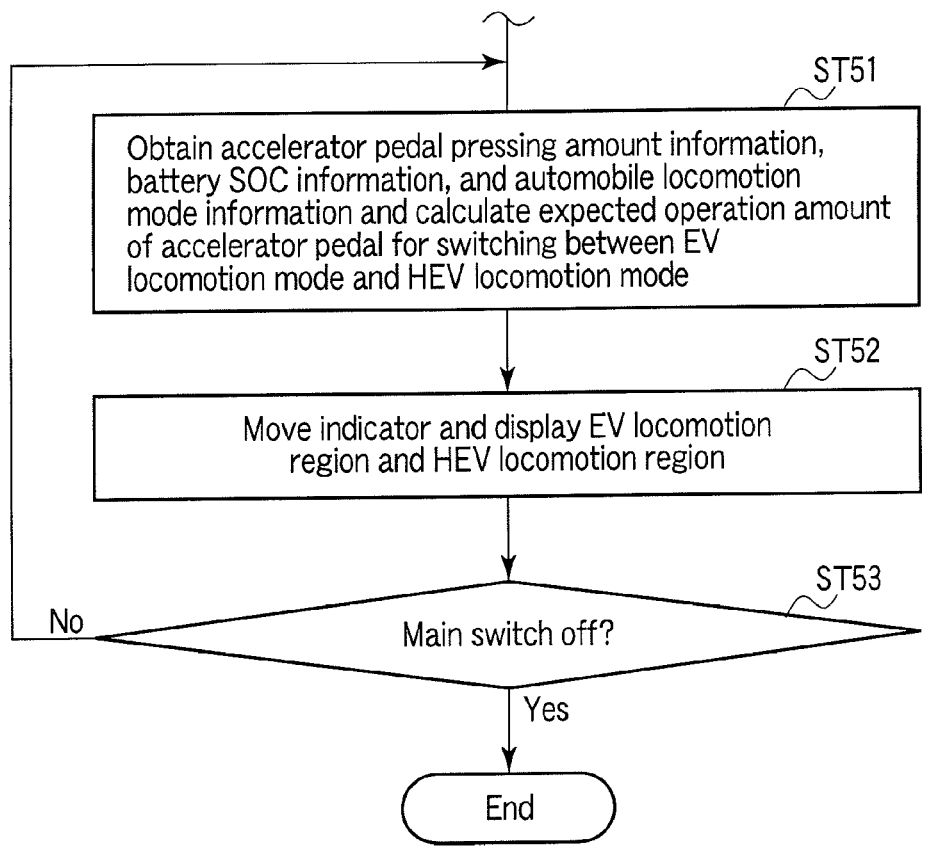
FIG. 10 is a flowchart showing the operation of the meter ECU depicted in FIG. 1.

FIG. 10 is a flowchart showing an example of an operation in step ST5. As shown in FIG. 10, the processing advances to step ST51 from step ST4. In step ST51, the meter ECU 91 obtains information of the extent of depression of the accelerator pedal 50, SOC information of the battery 13, and information of the locomotion mode of the automobile from the hybrid ECU 55. Further, the meter ECU 91 calculates an expected extent of depression of the accelerator pedal 50 for switching the EV locomotion mode and the HEV locomotion mode based on the information of the extent of depression of the accelerator pedal 50 and the information of the SOC of the battery 13, thereby calculating data of the EV locomotion region R1 and the HEV locomotion region R2. Then, the processing advances to step ST52.

In step ST52, the meter ECU 91 moves the indicator 107 on the first sale portion 104 to a position associated with the extent of depression of the accelerator pedal 50 obtained in step ST51. Furthermore, the EV locomotion region R1 and the HEV locomotion region R2 are displayed based on the expected extent of depression of the accelerator pedal 50 for switching between the EV locomotion mode and the HEV locomotion mode calculated in step ST51. Immediately after start of locomotion, since a remaining capacity of the battery 13 is sufficient, the EV locomotion region R1 alone is displayed. Moreover, the processing advances to step ST53.

In step ST53, the meter ECU 91 determines whether the main switch 100 is off based on the information from the hybrid ECU 55. If the main switch 100 is not off, the processing returns to step ST51. The operations of steps ST51 to ST53 are repeated while the main switch 100 is not off.

During a predetermined period after the main switch 100 is turned on and the automobile 10 starts the locomotion, since the battery 13 is fully charged, the EV locomotion region R1 alone is displayed in the display region 106 as shown in FIG. 4.

When the automobile 10 continues the locomotion and the remaining capacity of the battery 13 is reduced, an expected locomotion distance is, e.g., approximately 70 km, i.e., the locomotion further continues for approximately 70 km, and then the meter ECU 91 calculates that the locomotion mode may be changed to the HEV locomotion depending on the extent of depression of the accelerator pedal 50 in step ST51.

Additionally, as shown in FIG. 5, the meter ECU 91 displays both the EV locomotion region R1 and the HEV locomotion region R2. In this manner, the HEV locomotion region R2 is displayed in the display region 106. It is to be noted that the HEV locomotion region R2 is not displayed in the display region 106 unless the meter ECU 91 expects the HEV locomotion mode. In other words, the second locomotion region is not displayed when the second locomotion region does not have to be displayed.

Furthermore, when the automobile 10 keeps locomotion, the remaining battery capacity is reduced, whereby an accelerator operation amount required to maintain the EV locomotion mode which is calculated by the meter ECU 91 in step ST51 is decreased.

The meter ECU 91 switches and displays the EV locomotion region R1 and the HEV locomotion region R2 in accordance with a calculated value of the accelerator operation amount required for maintaining the EV locomotion mode as shown in FIGS. 5, 6, and 7.

When the remaining capacity of the battery 13 runs out, the automobile 10 cannot travel in the EV locomotion mode. When the meter ECU 91 determines that the locomotion in the EV locomotion mode is impossible, the HEV locomotion region R2 alone is displayed in the display region.

When the meter ECU 91 detects that the main switch 100 has been turned off in step ST53, it stops the operation of the display apparatus main body 90 and stops displaying an image in the display plane 101.

As described above, the range of the accelerator operation amount required for maintaining the EV locomotion mode can be recognized, and the expected extent of depression of the accelerator pedal 50 required for maintaining the EV locomotion mode when the locomotion is continued can be appreciated. That is, the driver can more accurately appreciate a relationship between the EV locomotion mode and the accelerator operation amount when the locomotion is continued.

Moreover, the minimum value of the first scale portion 104 and a minimum value of the second scale portion 105 are provided at the same position on the display plane 101. Therefore, the display region 106 can be widened.

Additionally, since the first scale portion 104 is surrounded by the frame portion 108, the driver can readily recognize the first scale portion 104. As a result, a position of the indicator 107 can be easily appreciated.

Further, the display apparatus main body 90 maintains the distance display mode for a predetermined time after the main switch 100 is turned on. As a result, the driver can recognize a distance for which the locomotion is possible in the EV locomotion mode when starting the locomotion.

Furthermore, the first and second scale portions 104 and 105 have linear shapes orthogonal to each other, the display region 106 can have a rectangular shape that is eye-friendly to the driver.

Moreover, since the EV locomotion region R1 and the HEV locomotion region R2 are displayed in different colors, the driver can easily recognize the EV locomotion region R1 and the HEV locomotion region R2.

Additionally, the meter ECU 91 calculates the expected extent of depression of the accelerator pedal 50 for switching between the EV locomotion mode and the HEV locomotion mode with respect to an expected locomotion distance in accordance with a remaining capacity, i.e., an SOC of the battery 13. Therefore, the driver can previously accurately appreciate a relationship between an expected distance for which the automobile 10 can travel in the EV locomotion mode and the extent of depression of the accelerator pedal 50. This point will now be specifically explained.

A maximum output value of the battery is not in proportion to a remaining capacity of the battery 13, but the maximum output value is maintained at a substantially fixed value until the remaining capacity of the battery 13 falls below a predetermined value, and it is precipitously reduced when the remaining capacity is reduced beyond this predetermined value. Therefore, it is difficult to calculate an expected distance for which the locomotion is possible in the EV locomotion mode based on the maximum output value of the battery 13. However, when the expected extent of depression of the accelerator pedal 50 required for switching between the EV locomotion mode and the HEV locomotion mode is calculated based on the remaining capacity of the battery 13, a relationship between the expected distance for which the locomotion in the EV locomotion mode is possible and an operation amount of the accelerator pedal 50 can be more accurately appreciated.

A display apparatus according to a second embodiment of the present invention will now be described with reference to FIG. 11. It is to be noted that reference numerals equal to those in the first embodiment denote structures having the same functions as those in the first embodiment, thereby omitting a description thereof. In this embodiment, a locomotion mode display pattern P1 is different from that in the first embodiment. Other structures may be the same as those in the first embodiment. The different structure will now be described.

FIG. 11 shows an example of the locomotion mode display pattern P1 according to this embodiment. As shown in FIG. 11, in this embodiment, the locomotion mode display pattern P1 does not include a frame portion 108 but, instead, a first scale portion 104 and positions near the first scale portion 104 have luminosities higher than luminosities of other regions. In other words, the first scale portion 104 and the positions near the first scale portion 104 are brighter than the other regions.

In FIG. 11, a range A1 that is displayed brighter than other regions is indicated by an alternate long and short dash line. In this embodiment, the range A1 is substantially equal to the range surrounded by the frame portion 108 in the first embodiment, for example.

As a configuration that the range A1 is displayed brighter than the other regions, there is, e.g., a configuration that the number of light sources such as LEDs that illuminate the range A1 is larger than those in the other regions or a configuration that a luminosity of a light source such as an LED that illuminates the range A1 is higher than luminosities of light sources used for the other regions. It is to be noted that the configuration that the luminosity in the range A1 is higher (brighter) than the luminosities in the other regions is not restricted to the above configuration. In short, the configuration that the luminosity in the range A1 is higher than the luminosities in the other regions can suffice.

In this embodiment, the range A1 is brighter than the other region since the luminosity in the range A1 is higher than the luminosities in the other regions. As a result, a driver can easily recognize the first scale portion 104 and readily appreciate a position of an indicator 107. In this embodiment, the same functions and effects as those in the first embodiment can be obtained.

It is to be noted that the frame portion 108 described in the first embodiment may be provided, and a luminosity of the first scale portion 104 may be higher than luminosities in the other regions as described in the second embodiment. For example, a luminosity in the frame portion 108 is set higher than the luminosities in the other regions. In this case, the same functions and effects as those in the first and second embodiments can be likewise obtained.

Further, in the first and second embodiments, the meter ECU 91 calculates an expected distance for which locomotion in the EV locomotion mode is possible and also calculates an accelerator operation amount required for switching between the EV locomotion mode and the HEV locomotion mode. Further, the meter ECU 91 functions as an example of a control unit in the present invention. However, the present invention is not restricted thereto. For example, an expected distance for which locomotion in the EV locomotion mode is possible and an accelerator operation amount required for switching between the EV locomotion mode and the HEV locomotion mode may be calculated by, e.g., any other control unit such as a hybrid ECU 55. Moreover, a calculated result may be transmitted to the meter ECU 91, and the meter ECU 91 may control video pictures displayed in the display apparatus main body 90 based on the transmitted data. In this case, for example, another ECU that performs the above-described calculation and the meter ECU 91 constitute the control unit in the present invention.

Additionally, although the HEV locomotion mode is a locomotion mode in which both the electric motor and the engine are used in the first and second embodiments, but the present invention is not restricted thereto. For example, even in the HEV locomotion mode, locomotion using the electric motor may be stopped and locomotion using the engine alone may be carried out depending on a remaining capacity of the battery. That is, the second locomotion mode in the present invention is a concept including the locomotion mode that locomotion is effected by using the engine alone.

The present invention is not restricted to the foregoing embodiments as it is, and constituent elements may be modified and embodied without departing from the gist on the embodying stage. Further, various kinds of inventions can be formed by appropriately combining a plurality of constituent elements disclosed in the foregoing embodiments. For example, some constituent elements may be eliminated from all constituent elements disclosed in the foregoing embodiments. Furthermore, constituent elements in different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus provided in a vehicle in which one of a first locomotion mode that an engine is stopped to perform locomotion using an electric motor for locomotion and a second locomotion mode that the engine is driven to perform locomotion is selected in accordance with an output request, comprising:

a display plane configured to display a first display portion that shows a locomotion region in the first locomotion mode in a display region based on the output request and a future travelable distance of the vehicle and a second display portion that shows a locomotion region in the second locomotion mode next to the first display portion in the display region; and a control unit configured to calculate a relationship between the output request and an estimated future travelable distance under the first locomotion mode, calculated based on a state of a battery that supplies power to the electric motor, and to control an image displayed in the display plane, wherein the control unit changes a border between the first display portion and the second display portion based on the estimated future travelable distance in accordance with an estimation result of displacement of a switching point between the first locomotion mode and the second locomotion mode determined based on the calculated relationship; and wherein the image includes an indicator indicative of the output request, and the indicator is displaced in a region which is a combination of the first display portion and the second display portion in accordance with the output request, the indicator moves in a first direction linearly extending in the display plane, and a scale portion configured to indicate the future travelable distance is formed on the display plane along a linear second direction orthogonal to the first direction.

2. The display apparatus according to claim 1, wherein the control unit displays in the display plane for a predetermined time the estimated travelable distance for which locomotion is possible in the first locomotion mode when a main switch of the vehicle is turned on.

3. The display apparatus according to claim 1, wherein the control unit estimates the displacement of the switching point based on a remaining capacity of electric power in the battery.

4. The display apparatus according to claim 1, wherein the first display portion and the second display portion are displayed in different colors in the display plane.

5. The display apparatus according to claim 1, wherein the image includes a frame portion that surrounds a region where the indicator moves.

6. The display apparatus according to claim 1, wherein a luminosity of the region where the indicator moves is higher than luminosities of other regions in the display plane.

7. The display apparatus according to claim 1, wherein a position of a minimum value of the output request indicated by the indicator and a position of a minimum value of the scale portion indicating the future travelable distance are set to the same position in the display plane.

8. The display apparatus according to claim 1 wherein the future travelable distance represents a travelable distance of the vehicle after detection of the output request indicated by the indicator, the display region is defined by a first scale portion indicating a magnitude of the output request and a second scale portion indicating the future travelable distance, the first display portion is displayed in the display region as required, shows a range of the output request when locomotion in the first locomotion mode at the time of the detection, shows an estimated range of the output request that locomotion in the first locomotion mode is estimated to be possible at each future travelable distance, the second display portion is displaced in the display region as required, shows a range of the output request when locomotion in the second locomotion mode at the time of the detection, and shows an estimated range of the output request that locomotion in the second locomotion mode is estimated to be possible at each future travelable distance, and the control unit moves the indicator to a position on the first scale portion associated with the output request at the time of the detection.

* * * * *